United States Patent

Gale et al.

[11] Patent Number: 6,121,740
[45] Date of Patent: Sep. 19, 2000

[54] CONTROL OF REGENERATION ENERGY FROM AN ELECTRIC MOTOR

[75] Inventors: Allan Roy Gale, Allen Park; William Lester Kelledes, Farmington Hills, both of Mich.

[73] Assignee: Ford Global Technologies, Inc., Dearborn, Mich.

[21] Appl. No.: 08/266,081

[22] Filed: Jun. 27, 1994

[51] Int. Cl.[7] .................................................. H02P 3/14
[52] U.S. Cl. ......................... 318/376; 318/362; 318/375; 318/382
[58] Field of Search .................................. 318/376, 362, 318/375, 382

[56] References Cited

U.S. PATENT DOCUMENTS

| Re. 32,543 | 11/1987 | Williamson . | |
|---|---|---|---|
| 3,774,095 | 11/1973 | Coccia | 318/376 |
| 3,890,551 | 6/1975 | Plunkett . | |
| 4,093,900 | 6/1978 | Plunkett | 318/376 |
| 4,096,423 | 6/1978 | Bailey et al. . | |
| 4,124,812 | 11/1978 | Naito et al. . | |
| 4,520,353 | 5/1985 | McAuliffe . | |
| 4,554,999 | 11/1985 | Kamaike | 318/376 |
| 4,678,998 | 7/1987 | Muramatsu . | |
| 4,730,151 | 3/1988 | Florey et al. . | |
| 4,876,513 | 10/1989 | Brilmyer et al. . | |
| 5,151,637 | 9/1992 | Takada et al. | 318/376 |
| 5,420,491 | 5/1995 | Kanzaki et al. | 318/376 X |

OTHER PUBLICATIONS

Kirschen et al., "Optimal Efficiency Control of an Induction Motor Drive", IEEE–PES Transactions on Energy Conversion, Mar. 1987.

Primary Examiner—Karen Masih
Attorney, Agent, or Firm—Mark L. Mollon

[57] ABSTRACT

A method and apparatus are disclosed for controlling regenerative energy from an induction motor. The induction motor is connected to a battery, which is intended to capture the regenerative energy of the induction motor. Normally, the induction motor is operated at peak efficiency, to capture as much energy as possible. However, when the battery becomes nearly fully charged, the induction motor is operated at reduced efficiency to prevent overcharging of the battery. The operating point of reduced efficiency of the induction motor is a point at which electrical losses are relatively more located in the stator of the motor than in the rotor of the motor. The stator of an induction motor is generally better cooled than the rotor.

14 Claims, 2 Drawing Sheets

CONTROL OF REGENERATION ENERGY FROM AN ELECTRIC MOTOR

BACKGROUND OF THE INVENTION

1. Field of the Invention

The present invention relates generally to electric motor control and more specifically to control of regeneration energy from an induction motor.

2. Description of the Related Art

In an electrically-driven automobile, an important goal is to make the automobile operate like an automobile driven by a traditional internal combustion engine. In furtherance of that goal, one feature of an internal combustion engine which designers of electrically-driven automobiles attempt to emulate is "engine braking". Engine braking is the tendency of an internal combustion engine to slow the automobile when the driver is not requesting the internal combustion engine to accelerate the automobile. Engine braking is the result of an internal combustion engine and its driveline requiring significant torque to rotate when the engine is not generating torque.

An electric motor does not require nearly as large of a torque to rotate as does an internal combustion engine and its driveline. Therefore, without other means to create an engine braking effect, an electrically-driven automobile will feel like it has much less engine braking than an automobile driven by an internal combustion engine.

One way to increase the feel of engine braking in an electrically-driven automobile is to operate the electric motor in "regeneration mode". In regeneration mode, the motor operates as a generator. Instead of current flowing to the motor from the motor's electrical power source (generally a battery called a "traction battery"), current flows from the motor to the power source. As those versed in the art recognize, a generator exerts a torque load on the mechanism driving the generator. This torque load can provide the feel of engine braking which would otherwise be substantially missing in an electrically-driven automobile.

Using regeneration to create a feel of engine braking creates a by-product, namely the electrical energy generated when the electric motor runs in regeneration mode. Generally, that energy can be put to very good use in charging the traction battery. The energy can then be used when the motor is once again commanded to generate torque to motivate the automobile.

However, a difficulty occurs when the automobile's traction battery is near-fully charged.

Sodium-sulfur batteries, often considered for use in electric vehicles, become damaged if they are overcharged. Further, when a lead-acid battery is used, overcharging can cause the battery to overheat and its electrolyte to boil.

It is therefore apparent that providing regenerative energy to a near-fully charged battery can be disadvantageous.

One way to solve the problem of overcharging the traction battery is to provide an alternative destination for the regeneration energy. One possible alternative destination is a large bank of load resistors connected to accept regeneration energy when the traction battery is near-fully charged. Although this solution is feasible, such a bank of load resistors can add considerable cost to a vehicle. Another possible alternative destination for excess regeneration energy is to turn on electrical loads in the vehicle (e.g., rear window defogger, heated windshield, and the like) when needed to accept excess regeneration energy when the traction battery is near-fully charged. However, engine braking has been shown to require about 5000 watts of mechanical power under some circumstances. There are generally not enough electrical loads on a vehicle which can be turned on to dissipate the large amount of power which would be generated by the motor in this event.

Another way to solve the problem of overcharging the traction battery is to "plug" the electric motor. Plugging a motor refers attempting to drive the motor (which is rotating in one direction) in the other direction. Although an engine braking effect can be obtained, very high slip occurs in the motor when it is plugged. (Slip is defined as the difference between the frequency of rotation of the rotor of the motor and the frequency of rotation of the magnetic field in the motor.) Such high slip induces very high current in the rotor of the motor. The high rotor current can induce enough heat to damage the rotor.

Because of the lack of desirable ways to emulate engine braking without overcharging the traction battery, a means for providing engine braking without overcharging the traction battery will provide advantages over the prior art.

SUMMARY OF THE INVENTION

The present invention provides a method for controlling regeneration energy from an electric motor, the electric motor having a stator and a rotor. The method comprises the steps of (a) operating the electric motor in a regeneration mode at a first operating point, and (b) operating the electric motor in a regeneration mode at a second operating point of reduced efficiency with respect to the first operating point in response to a regeneration current of the motor.

The present invention also provides a method for controlling regeneration energy from an electric motor, the electric motor having a stator and a rotor. The method includes the step of operating the electric motor in a regeneration mode at a first operating point. Further, the method includes the step of providing a battery to receive regeneration current from the motor. Also, the method includes the step of operating the electric motor in a regeneration mode at a second operating point of reduced efficiency with respect to the first operating point in response to a regeneration current flowing into the battery and a variable representing a state of charge of the battery.

In addition, the present invention provides an apparatus for controlling regeneration energy from an electric motor, the electric motor having a stator and a rotor. The apparatus includes means for operating the electric motor in a regeneration mode at a first operating point. The apparatus further includes a battery electrically coupled to the electric motor to receive regeneration current from the motor. Also, the apparatus includes means for operating the motor in a regeneration mode at a second operating point of reduced efficiency with respect to the first operating point in response to a regeneration current flowing into the battery and a variable representing a state of charge of the battery.

The invention solves the problem previously described in that it reduces the regeneration current from an electric motor when the battery receiving the current approaches full charge. Therefore, there is no need to employ electrical loads to dissipate excess regeneration current. The invention also provides an alternative to "plugging" the motor.

DETAILED DESCRIPTION OF THE PREFERRED EMBODIMENT

Figure 1:
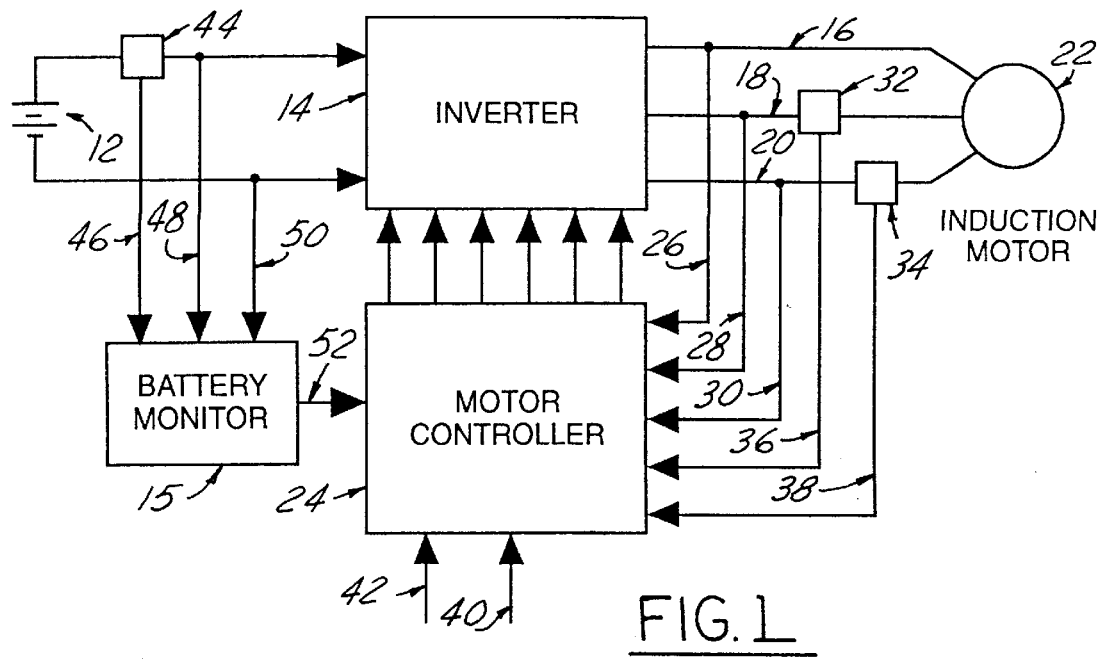
FIG. 1 is an induction motor control system according to the present invention.

A system for controlling an electric motor according to the present invention is illustrated in FIG. 1. A traction battery 12 is the power source for the system. Typical choices for traction battery 12 include lead-acid batteries and sodium-sulfur batteries. An inverter 14 converts DC voltage from traction battery 12 into three-phase voltage supplied on circuits 16, 18 and 20 to induction motor 22. Inverter 14 is of a configuration well-known in the art. It contains six insulated gate bipolar transistors (IGBTs). The switching of the IGBTs converts the DC voltage from traction battery 12 into the three-phase voltage supplied to induction motor 22.

Motor controller 24, a microprocessor-based component, is responsible for controlling the switching of the six IGBTs in inverter 14. Motor controller 24 performs field-oriented control, an induction motor control method well-known in the art. In performing field-oriented control, motor controller 24 resolves the three-phase currents on circuits 16, 18 and 20 into a quadrature-axis current $i_{qs}$ and a direct-axis current $i_{ds}$. Torque of induction motor 22 is then given by $$T = k i_{qs} \lambda_{dr},$$

where T is torque, $i_{qs}$ is quadrature-axis current and $\lambda_{dr}$ is direct-axis rotor flux, and k is a constant determined by the geometry of induction motor 22. Rotor flux $\lambda_{dr}$ is a function of $i_{ds}$ but independent of $i_{qs}$. As a result, field-oriented control provides the advantage of decoupling torque and flux of induction motor 22, thereby facilitating effective motor control.

Inputs used in field-oriented control include the voltages on the three phases of induction motor 22, which are fed to motor controller 24 on circuits 26, 28 and 30. Also, the currents on circuits 18 and 20 are sensed by current sensors 32 and 34 and fed to motor controller 24 on circuits 36 and 38. Current sensors 32 and 34 are preferably sensors known in the art as AC/DC current transducers. One such transducer is marketed under the brand name LEM LT'300S; this is a 300-ampere current transducer. Also, driver acceleration command 40 is fed to motor controller 24 from an acceleration pedal potentiometer. Driver acceleration command 40 tells motor controller 24 how much torque to cause induction motor 22 to produce.

Where motor controller 24 also is designed to cause engine braking, a brake pedal switch input 42 is also provided to motor controller 24. When either the brake pedal is applied or the accelerator is released, motor controller 24 commands induction motor 22 to create an engine braking effect by operating in regeneration mode. In regeneration mode induction motor 22 acts as a generator. Such operation charges traction battery 12.

The above description describes a motor control system and motor control functions known in the art of motor control for electrically-driven vehicles.

In the preferred embodiment of the present invention, motor controller 24 has responsibility for preventing overcharging of traction battery 12 when induction motor 22 operates in regeneration mode. In preventing such overcharging, motor controller 24 takes advantage of the fact that induction motor 22 has an efficiency curve generally as shown in FIG. 2.

Figure 2:
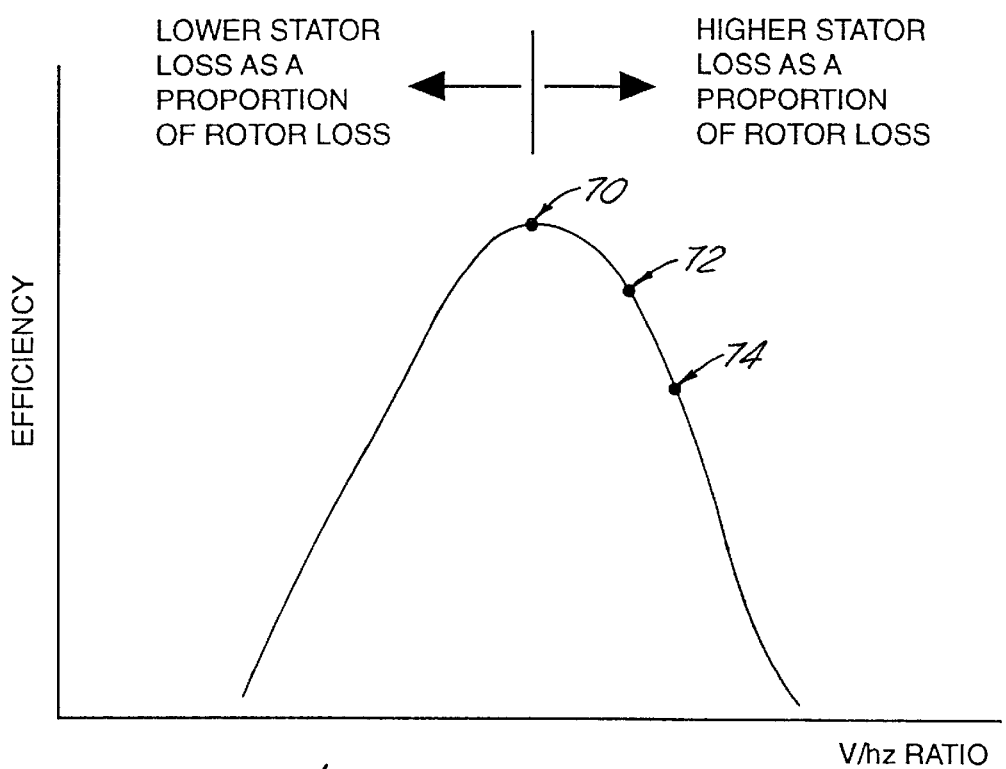
FIG. 2 is a representation of regenerative efficiency versus volts-per-hertz ratio for induction motor 22 of FIG. 1.

The dependent variable of the curve of FIG. 2 is efficiency of induction motor 22. The independent variable is the volts-per-hertz ratio at which induction motor 22 is operated. The volts-per-hertz ratio is the ratio of the amplitude of the voltages supplied on the three phases of induction motor 22 to the frequency of those voltages. A higher volts-per-hertz ratio means that induction motor 22 is more "excited". A higher volts-per-hertz ratio can be created in a field-oriented control environment by, for example, controlling induction motor 22 at a higher value of quadrature-axis stator current ($i_{qs}$) a lower value of rotor flux ($\lambda_{dr}$), or both. Conversely, a lower volts-per-hertz ratio can be accomplished by controlling induction motor 22 at a lower value of quadrature-axis stator current, a higher value of rotor flux, or both.

Generally, motor controller 24 will control induction motor 22 such that regeneration occurs at peak 70 of the curve of FIG. 2. The maximum amount of regenerative energy will thus be available to be stored in traction battery 12 and recovered later. However, when traction battery 12 approaches being fully charged, maximum regenerative energy is not desired from induction motor 22. Quite to the contrary, it is instead desirable to reduce regenerative energy supplied to traction battery 12, to avoid overcharging and possibly damaging traction battery 12.

Battery monitor 15 is responsible for monitoring the state of charge of traction battery 12. Current sensor 44 senses the current at the positive terminal of traction battery 12. Current sensor 44 can be a current shunt, an AC/DC current transducer, or another type of current sensor suitable for sensing the current at traction battery 12. Circuit 46 passes this signal from current sensor 44 to battery monitor 15. Circuits 48 and 50 allow battery monitor 15 to read the voltage across traction battery 12. Battery monitor 15 is preferably a microprocessor-based component, with sufficient hardware such as counters, registers and memory to perform the functions described herein. Battery monitor 15 estimates the state of charge of traction battery 12, using the voltage and current signals provided on circuits 46, 48 and 50. Such state of charge estimators are well-known to the art. As examples, see U.S. Pat. No. 4,520,353, issued to McAuliffe; U.S. Pat. No. 4,678,998, issued to Muramatsu; and U.S. Pat. No. 4,876,513, issued to Brilmyer et al. Those patents are incorporated herein by reference.

The state of charge of traction battery 12 is passed to motor controller 24 via circuit 52. Preferably, the state of charge is sent via a serial communications method such as the Standard Corporate Protocol (SCP) from Ford Motor Company. Other known serial communication methods can also work very satisfactorily, as can a dedicated circuit such as a pulse-width-modulated circuit. Additionally, the present charging current as measured by sensor 44 and supplied to battery monitor 15 is passed to motor controller 24 via serial communications on circuit 52. Again, the charging current information can also be passed to motor controller 24 on a dedicated circuit such as a pulse-width-modulated circuit.

In the preferred embodiment of the present invention, motor controller 24 reduces the regenerative energy supplied by induction motor 22 to traction battery 12 by causing induction motor 22 to operate off the peak 70 of the efficiency curve shown in FIG. 2. Operating off the efficiency peak implies that less regeneration energy will be generated by induction motor 22.

It is preferable for motor controller 24 to cause off-peak operation of induction motor 22 to occur to the right of peak 70 of the curve of FIG. 2. Operating points 72 and 74 are examples of operating points to the right of peak 70. Operating on that side of peak 70 pushes electrical power losses of induction motor 22 more into the stator of motor 22 and less into the rotor of induction motor 22. That is, electrical power losses occurring in the stator are larger as a proportion of the electrical power losses occurring in the rotor when induction motor 22 operates to the right of peak 70. In general, the stator of induction motor 22 is much better cooled and therefore more able to dissipate the heat generated by increased losses of induction motor 22. If, on the other hand, off-peak operation of induction motor 22 were to occur on the left of peak 70, the electrical power losses would be pushed more into the relatively poorly-cooled rotor of induction motor 22. That is, the electrical power losses occurring in the stator would be smaller as a proportion of the electrical power losses occurring in the rotor.

Figure 3:
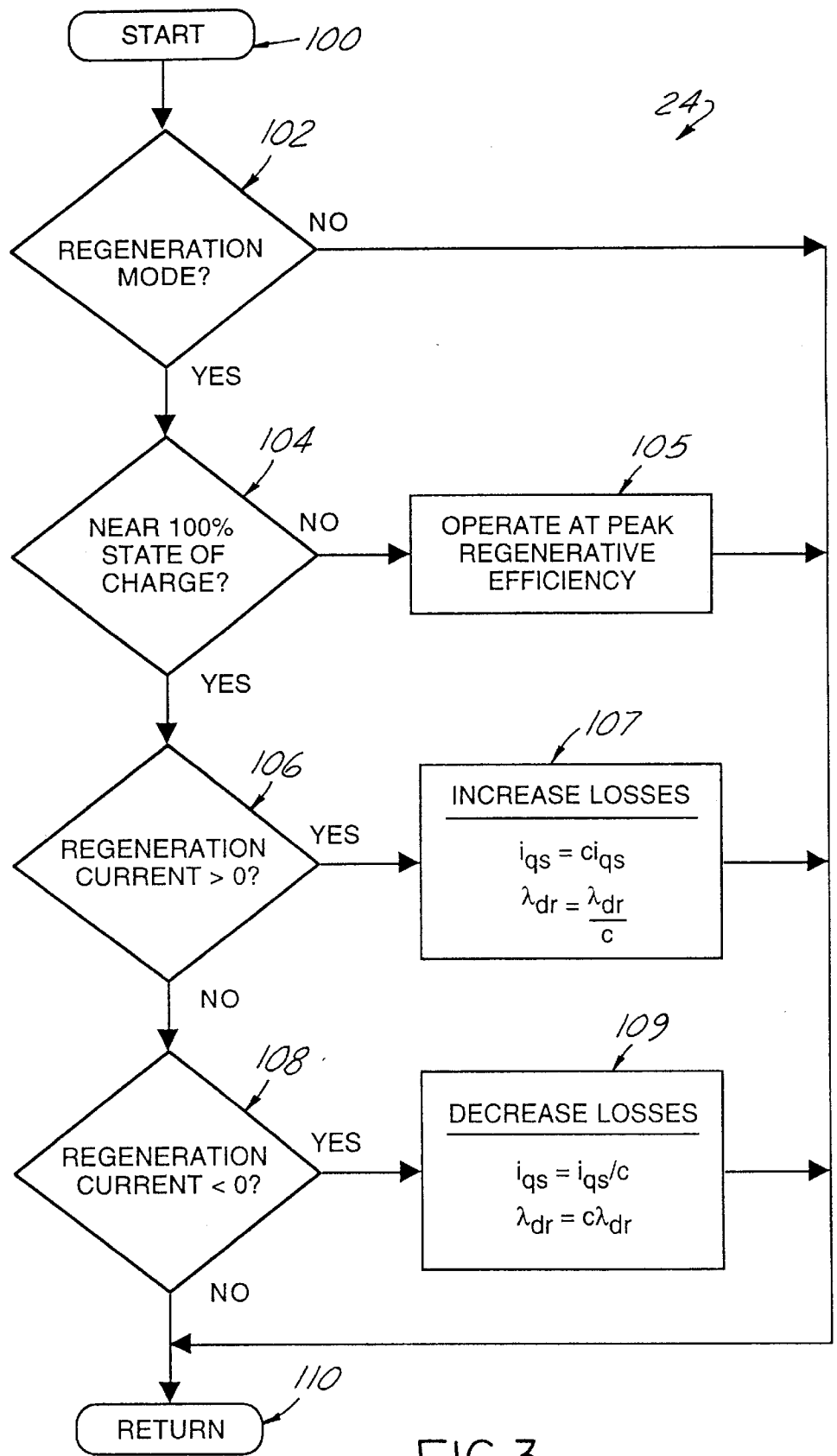
FIG. 3 is a portion of the logic performed by motor controller 24 of FIG. 1.

The algorithm performed by motor controller 24 in managing the off-peak operation of induction motor 22 is illustrated in FIG. 3. At step 102, motor controller 24 determines whether it is controlling in regenerative mode to create engine braking. If the answer is NO, the algorithm is exited at step 110 because there is by definition no regenerative energy to control. If induction motor is in regenerative mode, the algorithm proceeds to step 104. At step 104, motor controller 24 determines whether traction battery 12 is near 100% state of charge. Recall that motor controller 24 receives state-of-charge information via circuit 52 from battery monitor 15. "Near 100% state of charge" is preferably in the range of 80% to 100%. If traction battery 12 is not near 100% state of charge, off-peak control of induction motor 22 is not needed. That is, motor controller 24 can control induction motor 22 at peak efficiency, providing maximum regenerative energy to traction battery 12.

If traction battery 12 is not near 100% state of charge, the algorithm continues to operate at peak efficiency (step 105) and then exits at step 110. If traction battery 12 is near 100% state of charge, the algorithm proceeds to step 106. At step 106, motor controller 24 examines whether regenerative current being supplied to traction battery 12 is positive. (We will define positive regenerative current as current flowing into traction battery 12). Recall that motor controller 24 receives regenerative current information from battery monitor 15 via circuit 52. If regenerative current is positive, a decrease in regenerative current is needed. The algorithm then moves to step 107. At step 107, $i_{qs}$ is increased by a constant factor (called "c" in FIG. 3) to push operation of induction motor 22 to the right of peak 70 of the curve of FIG. 2. "c" is positive and greater than unity. At the same time, $\lambda_{dr}$ is reduced by that same factor of "c". The result of increasing $i_{qs}$ and decreasing $\lambda_{dr}$ by the same amount is that the torque of induction motor 22 is unchanged. (Recall that the torque of a field-oriented induction motor is proportional to the product of $i_{qs}$ and $\lambda_{ds}$). Thus, while the electrical power losses of induction motor are increased, the feeling of engine braking is unaffected due to the fact that the torque of induction motor 22 is unchanged. The algorithm then exits at step 110.

If regenerative current is not positive at step 106, regenerative current is examined again at step 108. Here, if regenerative current is negative, induction motor 22 is operating at such a poor efficiency that it is draining traction battery 12. This situation indicates that operation of induction motor 22 was pushed too far to the right of peak 70 of the curve of FIG. 2. As a result, the algorithm moves to step 109. At step 109, $i_{qs}$ is reduced by a factor of "c", thereby pushing the operating point of induction motor 22 from right to left in the curve of FIG. 2, toward peak 70 of the curve. At the same time, $\lambda_{dr}$ is increased by the same factor of "c", also tending to push operation of induction motor to the left on the curve of FIG. 2. As a result of the operations of step 109, the losses of induction motor 22 are reduced, but the torque of induction motor 22 is unchanged. Also, although the operating point of induction motor 22 has moved toward the left, the operating point of induction motor 22 remains to the right of peak 70 of the curve of FIG. 2. The algorithm then exits at step 110.

If it is determined at step 108 that regenerative current is not negative, the algorithm is exited at step 110. The implication of so exiting the algorithm after step 108 is that regenerative current is neither positive nor negative, so it must be essentially zero. Therefore, induction motor 22 is operating at a proper operating point, given a traction battery 12 with nearly 100% state of charge. So, no modification is made to the operating point of induction motor 22.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for controlling regeneration energy from an electric motor, said electric motor having a stator and a rotor, said method comprising the steps of:

(a) operating said electric motor in a regeneration mode at a first operating point; and (b) operating said electric motor in a regeneration mode at a second operating point of reduced efficiency with respect to said first operating point in response to a regeneration current generated by said electric motor.

2. A method for controlling regeneration energy from an electric motor as recited in claim 1, wherein said second operating point is further an operating point of increased stator electrical power losses as a proportion of rotor power electrical losses when compared to said first operating point.

3. A method for controlling regeneration energy from an electric motor as recited in claim 2, wherein a stator current of said motor is larger at said second operating point than at said first operating point.

4. A method for controlling regeneration energy from an electric motor as recited in claim 3, wherein a rotor flux of said motor is less at said second operating point than at said first operating point.

5. A method of controlling regeneration energy from an electric motor as recited in claim 2, wherein said second operating point is further an operating point at which a ratio of magnitude of applied voltage to said motor to frequency of applied voltage to said motor is greater than at said first operating point.

6. A method for controlling regeneration energy from an electric motor, said electric motor having a stator and a rotor, said method comprising the steps of:

(a) operating said electric motor in a regeneration mode at a first operating point;

(b) providing a battery to receive regeneration current from said motor;

(c) operating said electric motor in a regeneration mode at a second operating point of reduced efficiency with respect to said first operating point in response to a regeneration current flowing into said battery and a variable representing a state of charge of said battery.

7. A method for controlling regeneration energy from an electric motor as recited in claim 6, wherein said second operating point is further an operating point of increased stator electrical power losses as a proportion of rotor electrical power losses when compared to said first operating point.

8. A method for controlling regeneration energy from an electric motor as recited in claim 7, wherein a stator current of said motor is larger at said second operating point than at said first operating point.

9. A method for controlling regeneration energy from an electric motor as recited in claim 8, wherein a rotor flux is less at said second operating point than at said first operating point.

10. A method of controlling regeneration energy from an electric motor as recited in claim 9, wherein said second operating point is further a point at which a ratio of magnitude of applied voltage to said motor to frequency of applied voltage to said motor is greater than at said first operating point.

11. A method for controlling regeneration energy from an electric motor as recited in claim 10 wherein said second operating point is selected such that said regeneration current reaches a predetermined value.

12. A method for controlling regeneration energy from an electric motor as recited in claim 11 wherein said predetermined value is substantially zero amperes.

13. A method for controlling regeneration energy from an electric motor as recited in claim 12 wherein said first operating point is an operating point of substantially peak efficiency for said electric motor.

14. A method for controlling regeneration energy from an electric motor as recited in claim 13 wherein said electric motor is operated at said second operating point when said state of charge of said battery is in the range of 80% to 100%.

* * * * *